Oct. 30, 1962 T. C. BAKER 3,060,735
VOLUMETRIC MEASUREMENT
Filed Dec. 4, 1959
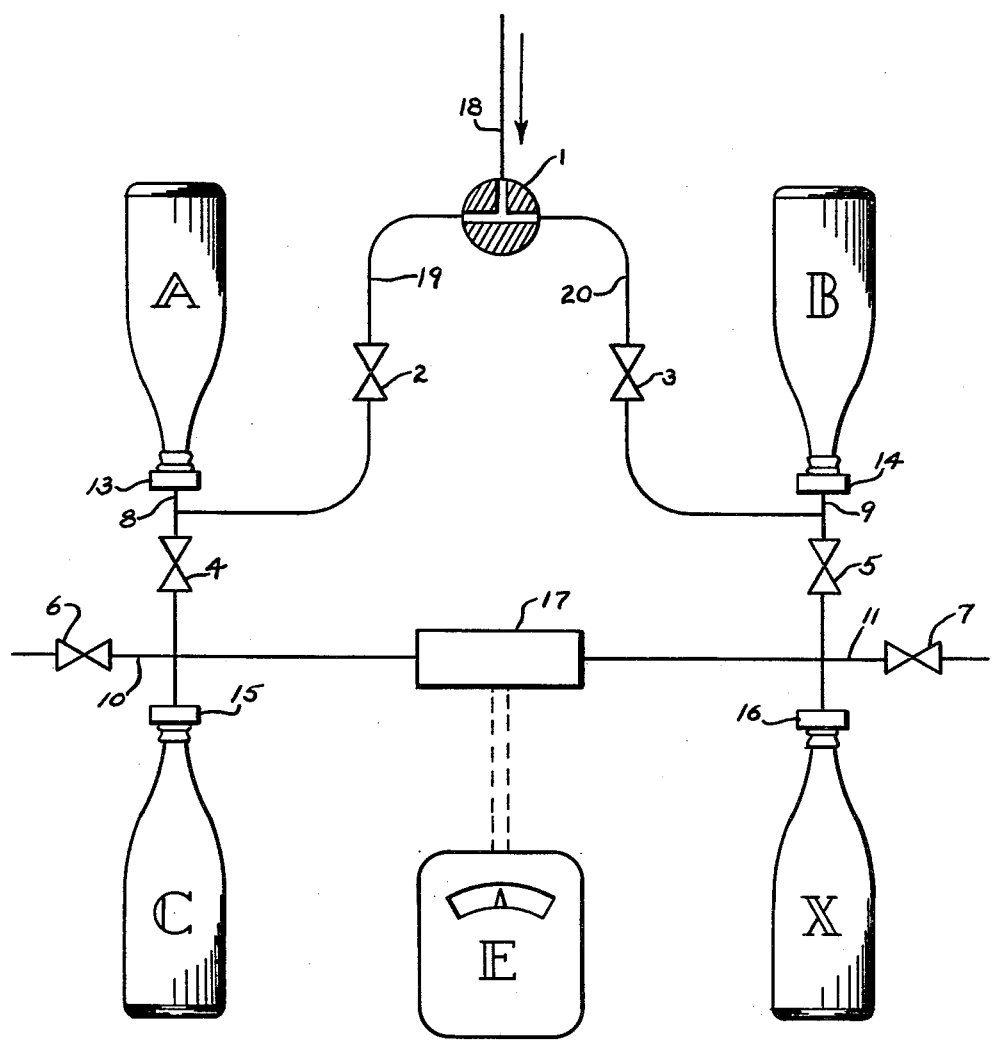
INVENTOR.
T. C. BAKER
BY W.A. Schaich &
Charles S. Lynch
ATTORNEYS

United States Patent Office 3,060,735
Patented Oct. 30, 1962

3,060,735
VOLUMETRIC MEASUREMENT
Theodore C. Baker, Wayne, Ohio, assignor to Owens-Illinois Glass Company, a corporation of Ohio
Filed Dec. 4, 1959, Ser. No. 857,443
4 Claims. (Cl. 73—149)

This invention relates to volumetric measurement. In one aspect of the invention it relates to a method for the volumetric measurement of a container. In another aspect of the invention it relates to apparatus for volumetric measurement of a container.

In the container industry, and in particular in the glass container industry, customer requirements often demand a very close control of the volumetric capacity of containers produced. At the present time the only manufacturing control of the volume of containers from a production machine is spot checks of random samples in the laboratory. This sometimes results in the shipping of a large order of containers to a customer, some of which do not meet the specified tolerances. There is therefore a need for a method of rapidly measuring with accuracy the volume of containers so that all or a large portion of the containers produced can be checked economically.

It is therefore an object of the invention to provide a method for rapidly and accurately measuring the volume of a container. It is a further object of the invention to provide apparatus for such measurement.

The accompanying drawing illustrates the princples of the invention and one form of apparatus in which the method of the invetnion can be practiced.

It will be seen that the drawing illustrates four containers A, B, C, and X. X is the container whose unknown volume is to be measured. Conduit 8 containing valve 4 connects bottles A and C through air-tight connections 13 and 15, respectively. Conduit 9 containing valve 5 connects containers B and X through the air-tight connections 14 and 16, respectively. Conduit 10 containing valve 6 communicates with conduit 8 between valve 4 and connection 15, and also connects with one side of differential pressure sensing means 17. Conduit 11 containing valve 7 communicates with line 9 between valve 5 and connection 16, and also communicates with the other side of differential pressure sensing means 17. Conduit 18 connects with a source of gas (not shown), usually air, under pressure. At the end of conduit 18 is 3-way valve 1, as shown. Conduit 19 connects 3-way valve 1 with line 8 between valve 4 and connection 13, and contains valve 2. Conduit 20 connects valve 1 with conduit 9 between valve 5 and connection 14 and contains valve 3.

Differential pressure sensing means in one embodiment can be a transducer, and in the particular embodiment shown in the FIGURE the differential pressure sensing means can be electrically connected to an electronic bridge, such as a Wheatstone bridge, which will indicate the extent of imbalance on either side of the differential pressure sensing means. The differential pressure sensing means can, of course, be any suitable means for indicating or sensing pressure differential, such as a manometer, or any common type of mechanical differential pressure gauge. However, in the embodiment specifically illustrated the differential pressure sensing means 17 is a transducer incorporating a strain gauge. This type of sensing means is advantageous in that it is quick acting and sensitive.

In describing the invention hereafter the volume of A, B, C and X will be referred to. In this discussion the designations of these respective volumes means not only the volume actually contained in the respective containers A, B, C and X but also the volumes of the various lines and apparatus which are in open communication with the respective containers when valves 2, 3, 4, 5, 6 and 7 are closed. Thus, for instance, the volume of container C in the following discussion is understood to include those portions of conduits 8 and 10 and the portion of the differential pressure sensing means 17 which are in open or vapor communication with the container C. Of course, in actual practice if the various conduits are kept short enough and small enough in diameter so that no appreciable error is introduced, the actual volume of the containers A, B, C and X alone can be considered and the volumes of the associated lines neglected.

In order to accomplish the purposes of the invention the ratio of the volume of container A to the volume of the container C is the same as the ratio of the volume of container B to the desired volume of the container X whose volume is to be determined. A simple embodiment, as in the present example, is where each of these ratios is 1. In carrying out the method of the invention valves 4 and 5 are first closed, with all other valves being open. Superatmospheric pressure air is introduced through line 18 and lines 19 and 20 to containers A and B, respectively, from a source (not shown). This pressure can be any pressure above atmospheric, say, one-half to one pound but usually ranging on up to 5 or 10 pounds or even 25 pounds or more above atmospheric pressure. Valve 1 is then closed with respect to line 18 but leaving lines 19 and 20 connected so that containers A and B come to an equilibrium pressure. During this time, since valves 6 and 7 are open to the atmosphere, containers C and X come to a common atmospheric pressure. Then all open valves are closed and immediately thereafter valves 4 and 5 are opened. The pressure between container A and container C and also between container B and container X then come to equilibrium and the pressure differential sensing means senses the pressure differential, or indicates perfect balance when this is the case.

The foregoing is a method of measuring volume by application of Boyles law in a novel and advantageous manner. Thus, the pressure in containers A and B need only be known very approximately and can be taken from the approximate line pressure in line 18. Thus, in previous methods, the pressure in the original container must be known exactly. Further, the final pressure in the bottle tested need not be known at all in contrast to prior art methods which require a precise determination of this pressure with a pressure gauge or other means and subsequent calculation according to Boyles law. The system has the advantages of being quite accurate and rapid. Also, the differential pressure sensing means can be connected to automatically control apparatus to automatically reject bottles which do not come within tolerable limits of volume.

Obviously valves 2 and 3 can be omitted with the 3-way valve 1 performing the function of these valves. Thus, 3-way valve 1 can be closed with respect to lines 19 and 20 instead of closing valves 2 and 3 as previously described.

As will be clearly understood by those skilled in the art, the application of Boyles law referred to hereinbefore to calculate the volume of the bottle X, where $\Delta P$=differential pressure sensed at 17, a positive value being where bottle X is too large
$V_A$=volume of bottle A
$V_B$=volume of bottle B
$V_C$=volume of bottle C
$V_X$=volume of bottle X n = ratio of volume of bottle A to bottle C and of bottle B to that desired in bottle X
$P_A'$ = initial pressure in A and B
$P_C'$ = initial pressure in C and X is to solve the equation $$\Delta P = \left(\frac{P_A'V_A + P_C'V_A/n}{V_A + V_A/n}\right) - \left(\frac{P_A'V_B + P_C'V_X}{V_B + V_X}\right)$$

Where $n$ is 1, this simplifies to $$\Delta P = \left(\frac{P_A'V_A + P_C'}{2V_A}\right) - \left(\frac{P_A'V_B + P_C'V_X}{V_B + V_X}\right)$$

Thus, as an example, when $n=1$ and bottles A, B and C are 1 liter and $P_A'$ is 35 p.s.i.a., $P_C'$ is 15 p.s.i.a., and the differential pressure at 17 is 1 p.s.i., the volume $V_X$ is easily calculated by substitution in the last equation, thus $$1 = \left(\frac{35+15}{2}\right) - \left(\frac{35(1) + 15V_X}{1 + V_X}\right)$$

solving, $$V_X = 12/9 \text{ liters}$$

As will be evident to those skilled in the art, various modifications of this invention can be made or followed in the light of the foregoing disclosure and discussion without departing from the spirit or scope of the disclosure or from the scope of the claims.

I claim:
1. A method of determining deviation of the volumetric capacity of a first container from a desired standard volume which comprises pressurizing, with a gas, each of second and third containers of known volume to a first pressure, pressurizing each of a fourth container of known volume and said first container with a gas to a second pressure lower than said first pressure establishing open communication between said second and fourth containers, and between said third and first containers, respectively, thereby allowing the second and fourth communicating containers to come to an equilibrium third pressure and said third and first containers to come to an equilibrium fourth pressure, and sensing the difference between said third and fourth pressures.

2. A method of claim 1 wherein the ratio of the volume of said second container to said fourth container is the same as the ratio of said third container to the desired said standard volume of said first container, and the amount of the said difference in said third and fourth pressures indicates the degree of deviation from said standard volume, and no difference in said third and fourth pressures indicates no deviation from said standard volume.

3. A method of claim 2 wherein said difference in pressure is sensed by a transducer.

4. Apparatus for determining deviation of a first container from a desired standard volume comprising second and third containers connected with a common source of gas pressure, a first gas tight conduit means connecting said second and a fourth container, a second gas tight conduit means for connecting said first container at one end, said second conduit means being connected at the other end to said third container, valve means in each of said gas tight conduit means, third and fourth conduit means connecting, respectively, said first and second conduit means with a second common source of gas pressure, each of said third and fourth conduit means containing a valve means, fifth and sixth gas tight conduit means operationally connecting opposite sides of a differential pressure responsive means, respectively, to said first and second gas tight conduit means.

References Cited in the file of this patent
UNITED STATES PATENTS

| | | |
|---|---|---|
| 1,720,934 | Toleik | July 26, 1929 |
| 2,113,686 | Gift | Apr. 12, 1938 |
| 2,266,566 | Poole | Dec. 16, 1941 |